United States Patent
Morreale et al.

(10) Patent No.: US 9,973,039 B2
(45) Date of Patent: May 15, 2018

(54) POWER RECEIVER, WIRELESS POWER SYSTEM AND RELATED METHOD OF TRANSMITTING INFORMATION WITH A POWER RECEIVER

(71) Applicant: STMicroelectronics S.r.l., Agrate Brianza (IT)

(72) Inventors: Danilo Antonio Claudio Morreale, Paterno (IT); Giovanni Benenati, S. Giovanni la Punta (IT); Roberto Larosa, Catania (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 609 days.

(21) Appl. No.: 14/594,365

(22) Filed: Jan. 12, 2015

(65) Prior Publication Data
US 2015/0207336 A1    Jul. 23, 2015

(30) Foreign Application Priority Data
Jan. 20, 2014   (IT) .............................. MI2014A0059

(51) Int. Cl.
| | |
|---|---|
| H01F 38/00 | (2006.01) |
| H02J 50/12 | (2016.01) |
| H02J 5/00 | (2016.01) |
| H02J 17/00 | (2006.01) |
| H02J 50/40 | (2016.01) |
| H02J 50/80 | (2016.01) |
| H02J 7/02 | (2016.01) |

(52) U.S. Cl.
CPC .............. *H02J 50/12* (2016.02); *H02J 5/005* (2013.01); *H02J 7/025* (2013.01); *H02J 17/00* (2013.01); *H02J 50/40* (2016.02); *H02J 50/80* (2016.02)

(58) Field of Classification Search
CPC .................................. H02J 5/005; H02J 7/025
USPC .......................................................... 307/104
See application file for complete search history.

(56) References Cited

U.S. PATENT DOCUMENTS

| | | | |
|---|---|---|---|
| 2010/0109443 A1* | 5/2010 | Cook ................... | H01Q 1/2225 307/104 |
| 2010/0123443 A1* | 5/2010 | Grimm ................ | H02M 3/156 323/282 |

(Continued)

FOREIGN PATENT DOCUMENTS

| | | |
|---|---|---|
| JP | H11341711 A | 12/1999 |
| WO | WO-2011062097 A1 | 5/2011 |

OTHER PUBLICATIONS

IT Search Report for MI2014A000059 dated Oct. 10, 2014 (8 pages).

*Primary Examiner* — Alfonso Perez Borroto
(74) *Attorney, Agent, or Firm* — Crowe & Dunlevy

(57) ABSTRACT

A power receiver includes a resonant circuit generating an internal supply voltage. A voltage rectification circuit receives the internal supply voltage and generate a corresponding rectified voltage. A voltage regulator receives the rectified voltage and a modulation signal and is configured to generate a corresponding regulated voltage. A controlled voltage-to-current converter receives the regulated voltage and the modulation signal. The converter operates to deliver, through an output line of the power receiver, an output current having a DC value corresponding to the DC value of said regulated voltage and having an AC value corresponding to said modulation signal.

20 Claims, 10 Drawing Sheets

(56) References Cited

U.S. PATENT DOCUMENTS

2013/0038277 A1    2/2013   Chan et al.
2013/0154554 A1*   6/2013   Sakai ..................... H02J 7/025
                                                                         320/108

\* cited by examiner

POWER RECEIVER, WIRELESS POWER SYSTEM AND RELATED METHOD OF TRANSMITTING INFORMATION WITH A POWER RECEIVER

PRIORITY CLAIM

This application claims priority from Italian Application for Patent No. MI2014A000059 filed Jan. 20, 2014, the disclosure of which is incorporated by reference.

TECHNICAL FIELD

This disclosure relates to systems for powering in a wireless fashion mobile devices and more particularly to a power receiver conceived to transmit information using a back scattering technique with an improved power efficiency.

BACKGROUND

The increased interest in wireless power transfer technology is evident both from the technical and consumer perspectives. Improved system efficiencies due to the emergence of resonant transfer of power have engendered the rapid increase of applications that are emerging for this technology.

These known power receivers have a power transfer efficiency that is unsatisfactorily for modern appliances, in which power consumption issues are very strict.

Wireless Power Systems (WPS), such as but not limited to that which is described by the Wireless Power Consortium (WPC) in the Qi standard (System description wireless power transfer Volume I: Low power, Part 1: Interface definition, Wireless Power Consortium v.1.0.1 Oct. 2010, incorporated by reference), use coupled electromagnetic (EM) fields from a primary subsystem (power transmitter) to transfer power through a nonconductive medium. The field is captured in a secondary subsystem and converted to useable energy.

A high-level block diagram of a Wireless Power System for powering a mobile device is depicted in FIG. 1. The shown power transmitter comprises two main functional units, namely a power conversion unit and a communications and control unit. The diagram explicitly shows the primary coil as the magnetic field generating element of the power conversion unit. The control and communications unit regulates the transferred power to the level that the magnetically coupled power receiver requests. A base station may contain multiple power transmitters in order to serve multiple mobile devices simultaneously. The wireless power system shown in the diagram typically comprises all other functionality of the base station, such as input power provisioning, control of multiple power transmitters, and user interfacing.

A power receiver comprises a power pick-up unit and a communications and control unit. Similar to the power conversion unit of the transmitter, the secondary coil is the magnetic field capturing element of the power pick-up unit. The communications and control unit regulates the transferred power to the level that is appropriate for the load connected to the output of the power receiver.

An important exemplary load to be powered is a battery pack that requires charging. Low power devices that use batteries are of real concern when using a WPS due to the adverse relation between increased temperatures with battery safety and performance. For these reasons, power receivers are equipped with a communications and control unit in order to cooperate to regulate the transferred power to the desired level. For this purpose, the power receiver communicates its power needs on a regular basis and continuously monitors the power transfer to ensure that limits imposed by the standard are not violated. If a violation occurs anyway, the power transmitter may abort the power transfer. This means that the power receiver communicates the difference between a desired set point and the actual set point to the power transmitter, which adjusts the primary coil current so as to reduce the error towards zero.

Exemplary electric diagrams of power transmitters are shown in FIGS. 2 and 3. They typically comprise a switching stage (half-bridge or full-bridge) that drives a L-C circuit that includes the primary coil $L_P$ and a corresponding primary capacitor $C_P$ fixing the resonance capacitance of the L-C circuit. The primary coil $L_P$ is used for supplying power to the power receiver and for receiving data signals (typically at higher frequency than the frequency of the power supply) generated by the communications and control unit of the power receiver.

An exemplary functional block diagram of a power receiver is shown in FIG. 4. The power pick-up unit on the left-hand side of FIG. 4 comprises the analog components of the power receiver, namely:

a dual resonant circuit, comprising a secondary coil plus series and parallel capacitances to enhance the power transfer efficiency and enable a resonant detection;

a rectification circuit that provides full-wave rectification of the AC waveform, using e.g. four diodes in a full-bridge configuration, or a suitable configuration of active components. The rectification circuit may perform output smoothing as well. In this example, the rectification circuit provides power to both the communications and control unit of the power receiver and the output of the power receiver;

a communications modulator: on the DC side of the power receiver, the communications modulator typically comprising a resistor in series with a switch. On the AC side of the power receiver, the communications modulator typically comprises a capacitor in series with a switch (not shown in FIG. 4);

an output disconnect switch, which prevents current from flowing to the output when the power receiver does not provide power at its output. In addition, the output disconnect switch prevents current back flow into the power receiver when the power receiver does not provide power at its output. Moreover, the output disconnect switch minimizes the power that the power receiver draws from the power transmitter when a power signal is first applied to the secondary coil;

a rectified voltage sense.

The communications and control unit on the right-hand side of FIG. 4 comprises the digital logic part of the power receiver. This unit executes the relevant power control algorithms and protocols, drives the communications modulator, controls the output disconnect switch, and monitors several sensing circuits, in both the power pick-up unit and the load. An example of a sensing circuit in the load is a circuit that measures the temperature of, e.g., a rechargeable battery.

Power receiver designs that differ from the example functional block diagram shown in FIG. 4 are possible. For example, an alternative design includes post-regulation of the output of the rectification circuit (e.g., using a buck converter, battery charging circuit, power management unit, etc.).

The dual resonant circuit of the power receiver comprises a secondary coil $L_S$ and two resonant capacitances $C_S$ and $C_D$, as shown by way of example in FIG. 5. The secondary resonant capacitance $C_S$ is used to enhance power transfer efficiency. The purpose of the auxiliary resonant capacitance $C_D$ is to enable a resonant detection method. FIG. 5 illustrates a dual resonant circuit. The switch in the dual resonant circuit is optional. If the switch is not present, the capacitance $C_D$ has a fixed connection to the secondary coil.

An exemplary electric diagram of a power receiver that includes a communications modulator connected to a secondary coil $L_S$, a rectification circuit composed of a diode bridge, suitable for charging a Lithium ions battery is shown in FIG. 6. Data are transmitted from the power receiver back to the power transmitter with a "back-scattering" technique by switching a R-C load (composed of the resistor R and of the two communication modulating capacitances $C_{CM}$) referred to a common ground node.

An alternative electric diagram of a power receiver is shown in FIG. 7. The "back-scattering" technique is implemented by switching a resistive load $R_{CM}$ referred to a common ground node. The rectified voltage $V_R$ is provided in input to a voltage regulator, for example a buck converter, that generates a regulated voltage that may be used to charge a battery. Information about the charging state of the battery is transmitted back to the power transmitter with a back scattering technique while the battery is being charge. Typically, exemplary time graphs of the charge voltage of the battery and of the charge current absorbed therefrom are as shown in FIG. 8.

SUMMARY

Deep studies conducted by the inventors in the effort of optimizing power consumption, have led to infer that implementing a back scattering transmission by switching a R-C load or a resistive load $R_{CM}$ may limit efficiency of power receivers. Even if the modulation of a load appears necessary for transmitting data back to the power transmitter magnetically coupled with the power receiver, the inventors have realized that this modulation is power consuming because a current flows throughout a resistor referred to ground. For this reason, they have sought a different architecture in which data transmission is implemented with a back scattering technique by modulating the charge current of a battery charged by the power receiver.

This result is attained in a power receiver comprising:

a resonant circuit having a pair of supply terminals between which an internal supply voltage of the power receiver is made available, comprising:

a secondary coil ($L_S$) configured to be magnetically coupled with a primary coil of a power transmitter, a first resonance capacitance ($C_S$) coupled in series with said secondary coil ($L_S$), and a second resonance capacitance ($C_D$) coupled between said pair of supply terminals;

a voltage rectification circuit configured to receive in input said internal supply voltage and to generate a corresponding rectified voltage (Vr);

a voltage regulator configured to receive in input said rectified voltage (Vr) and eventually a modulation signal (Vmod), and to generate a corresponding regulated voltage (Vo);

a voltage-to-current converter configured to receive in input said regulated voltage (Vo) and eventually also said modulation signal (Vmod), adapted to deliver through an output line of the power receiver an output current having a DC value corresponding to the DC value of said regulated voltage (Vo) and having an AC value corresponding to said modulation signal (Vmod).

According to an embodiment, the power receiver comprises a control unit adapted to monitor a functioning state of a load powered by said power receiver, configured to be supplied with said regulated voltage (Vo) generated by said voltage regulator and to generate said modulation signal (Vmod) carrying information about said functioning state of the powered load.

According to an embodiment, said voltage regulator is adapted to adjust its functioning point to generate said regulated voltage (Vo) as the sum of a nominal constant voltage and of an AC voltage corresponding to said modulation signal (Vmod); said controlled voltage-to-current converter being configured to receive in input said regulated voltage (Vo) and to be controlled with a fixed voltage.

According to another embodiment, said voltage regulator is a feedback switching converter comprising: a voltage divider having a center tap, configured to generate at said center tap a feedback voltage as a function of said regulated voltage (Vo); an error amplifier configured to receive in input said feedback voltage and a fixed reference voltage (Vref); and a switched circuit connected to said center tap and controlled by said modulation signal (Vmod), to modulate the level of said feedback voltage synchronously with variations of said modulation signal (Vmod).

According to yet another embodiment, said voltage regulator is a feedback switching converter comprising: a voltage divider having a center tap, configured to generate at said center tap a feedback voltage as a scaled replica of said regulated voltage (Vo); an error amplifier configured to receive at a first input said feedback voltage and at a second input a reference voltage (Vrefa; Vrefb); and a switched circuit connected to said second input and controlled by said modulation signal (Vmod), configured to connect said second input either with a first reference voltage (Vrefa) or a second reference voltage (Vrefb) synchronously with variations of said modulation signal (Vmod).

According to yet another embodiment, said voltage regulator is adapted to adjust its functioning point to keep said regulated voltage (Vo) at a nominal constant voltage, and said controlled voltage-to-current converter is configured to receive in input said regulated voltage (Vo) and to be controlled with said modulation signal (Vmod).

According to yet another embodiment, the power receiver includes a switched capacitance circuit coupled between said pair of supply terminals, comprising at least a modulation capacitor ($C_M$) and a switch controlled with said modulation signal (Vmod) configured to connect/disconnect said modulation capacitor ($C_M$) to/from said secondary coil ($L_S$).

A mobile device may comprise a power receiver as defined above and a battery connected to the power receiver so as to be charged with the output current delivered thereby.

A wireless power transfer system may comprise: a power transmitter having a primary coil; and a power receiver as defined above the secondary coil of which is magnetically coupled with said primary coil.

An embodiment of the power receiver of this disclosure may implement a method of transmitting information contained in a modulation signal (Vmod) about a functioning state of a powered load, through the following steps:

adjusting the functioning point of the voltage regulator for generating said regulated voltage (Vo) as the sum of a nominal constant voltage and of an AC voltage corresponding to said modulation signal (Vmod);

providing said regulated voltage (Vo) in input to said controlled voltage-to-current converter;

controlling said voltage-to-current converter with a fixed voltage for delivering through an output line of the power receiver an output current having a DC value corresponding to the DC value of said regulated voltage (Vo) and having an AC value corresponding to an AC value of said regulated voltage (Vo).

Another embodiment of the power receiver of this disclosure may implement a method of transmitting information contained in a modulation signal (Vmod) about a functioning state of a powered load, through the following steps:

adjusting the functioning point of the voltage regulator for keeping said regulated voltage (Vo) at a nominal constant voltage;

providing said regulated voltage (Vo) in input to said controlled voltage-to-current converter;

controlling said controlled voltage-to-current converter with said modulation signal (Vmod) for delivering through an output line of the power receiver an output current having a DC value corresponding to the DC value of said regulated voltage (Vo) and having an AC value corresponding to an AC value of said regulated voltage (Vo).

The claims as filed are integral part of this specification and are herein incorporated by reference.

DETAILED DESCRIPTION

Wireless Power Systems (WPS), such as but not limited to that which is described by the Wireless Power Consortium (WPC) in the Qi standard (System description wireless power transfer Volume I: Low power, Part 1: Interface definition, Wireless Power Consortium v.1.0.1 Oct. 2010, incorporated by reference), use coupled electromagnetic (EM) fields from a primary subsystem (power transmitter) to transfer power through a nonconductive medium. The field is captured in a secondary subsystem and converted to useable energy.

Figure 1:
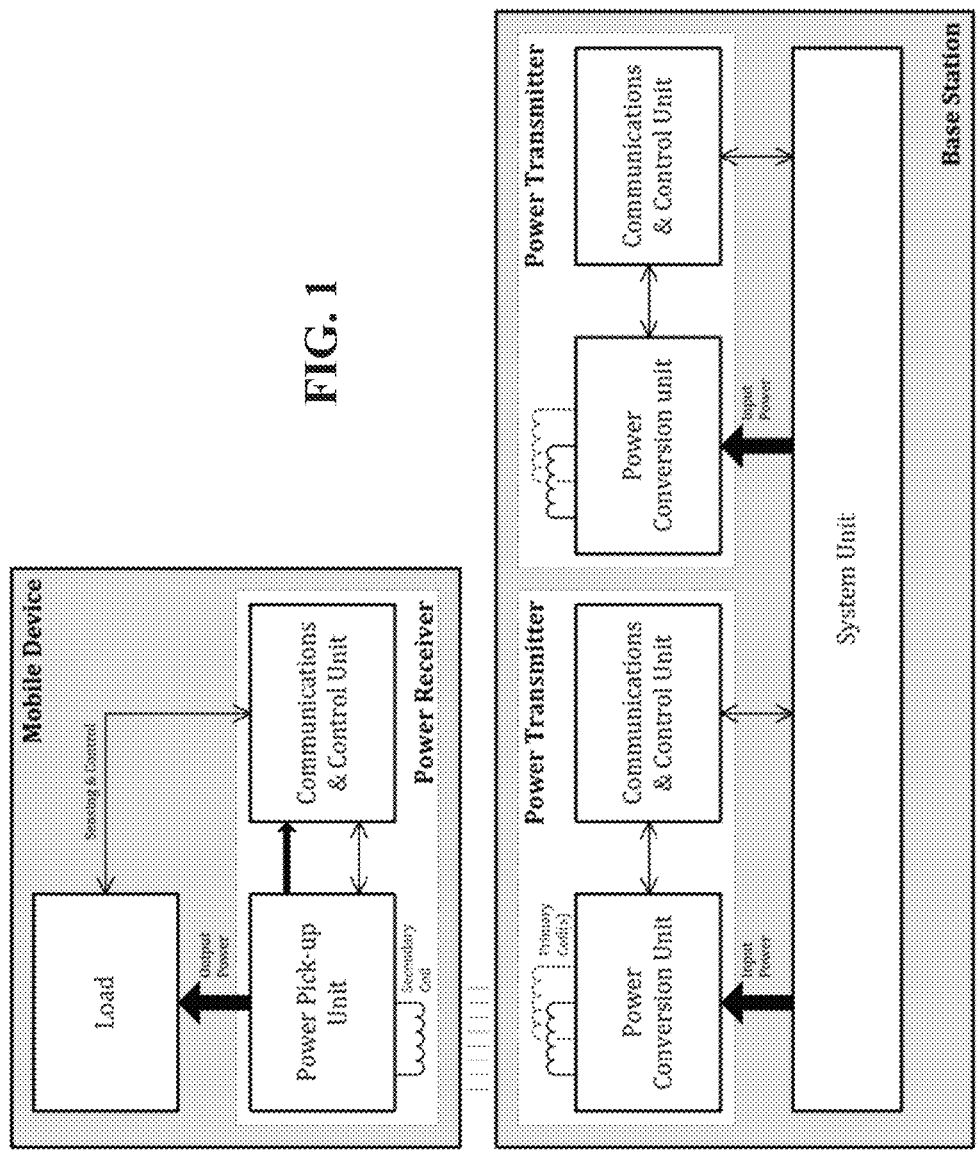
FIG. 1 is a high-level block diagram of a Wireless Power System for powering a mobile device.

A high-level block diagram of a Wireless Power System for powering a mobile device is depicted in FIG. 1. The shown power transmitter comprises two main functional units, namely a power conversion unit and a communications and control unit. The diagram explicitly shows the primary coil as the magnetic field generating element of the power conversion unit. The control and communications unit regulates the transferred power to the level that the magnetically coupled power receiver requests. A base station may contain multiple power transmitters in order to serve multiple mobile devices simultaneously. The wireless power system shown in the diagram typically comprises all other functionality of the base station, such as input power provisioning, control of multiple power transmitters, and user interfacing.

A power receiver comprises a power pick-up unit and a communications and control unit. Similar to the power conversion unit of the transmitter, the secondary coil is the magnetic field capturing element of the power pick-up unit. The communications and control unit regulates the transferred power to the level that is appropriate for the load connected to the output of the power receiver.

An important exemplary load to be powered is a battery pack that requires charging. Low power devices that use batteries are of real concern when using a WPS due to the adverse relation between increased temperatures with battery safety and performance. For these reasons, power receivers are equipped with a communications and control unit in order to cooperate to regulate the transferred power to the desired level. For this purpose, the power receiver communicates its power needs on a regular basis and continuously monitors the power transfer to ensure that limits imposed by the standard are not violated. If a violation occurs anyway, the power transmitter may abort the power transfer. This means that the power receiver communicates the difference between a desired set point and the actual set point to the power transmitter, which adjusts the primary coil current so as to reduce the error towards zero.

Figure 2:
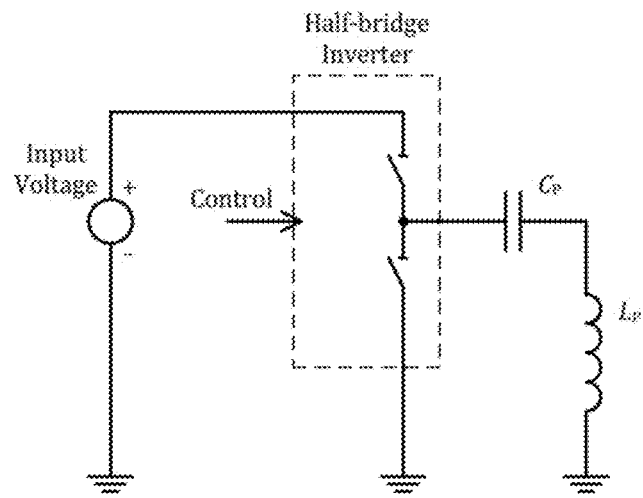
FIG. 2 shows an embodiment of a circuit for powering a primary coil of a power transmitter.
Figure 3:
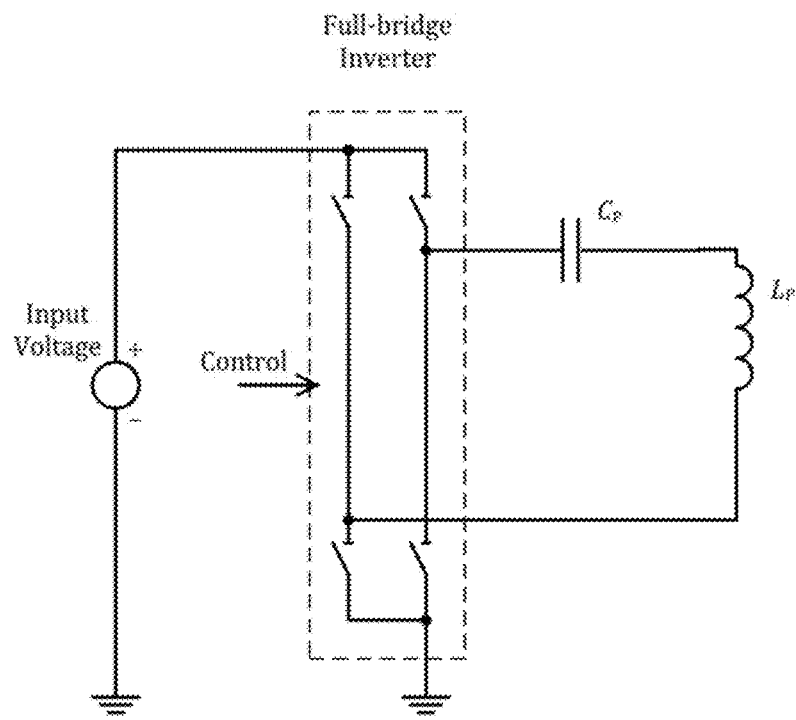
FIG. 3 shows another embodiment of a circuit for powering a primary coil of a power transmitter.

Exemplary electric diagrams of power transmitters are shown in FIGS. 2 and 3. They typically comprise a switching stage (half-bridge or full-bridge) that drives a L-C circuit that includes the primary coil LP and a corresponding primary capacitor CP fixing the resonance capacitance of the L-C circuit. The primary coil LP is used for supplying power to the power receiver and for receiving data signals (typically at higher frequency than the frequency of the power supply) generated by the communications and control unit of the power receiver.

Figure 4:
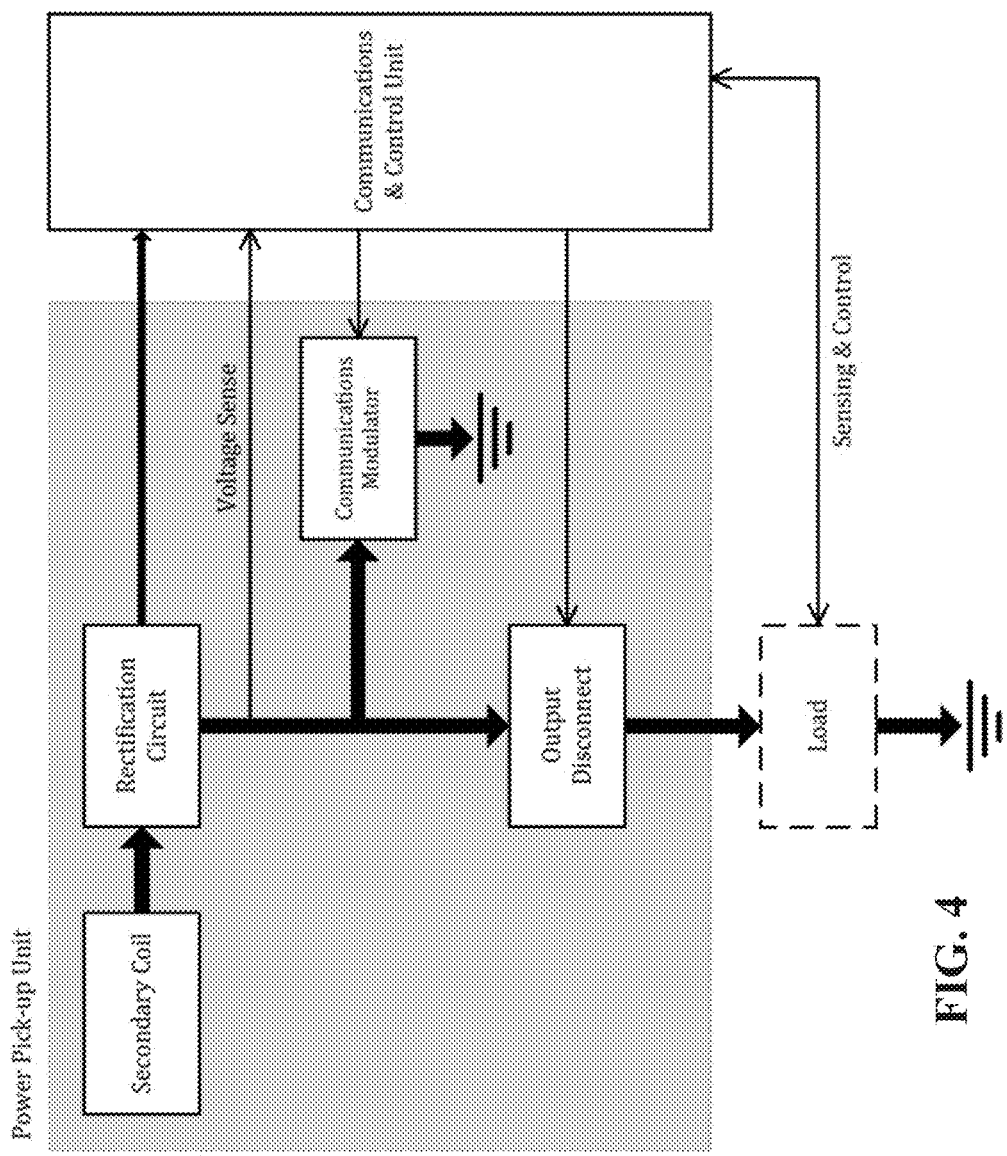
FIG. 4 shows an embodiment of a power receiver.

An exemplary functional block diagram of a power receiver is shown in FIG. 4. The power pick-up unit on the left-hand side of FIG. 4 comprises the analog components of the power receiver, namely:

a dual resonant circuit, comprising a secondary coil plus series and parallel capacitances to enhance the power transfer efficiency and enable a resonant detection;

a rectification circuit that provides full-wave rectification of the AC waveform, using e.g. four diodes in a full-bridge configuration, or a suitable configuration of active components. The rectification circuit may perform output smoothing as well. In this example, the rectification circuit provides power to both the communications and control unit of the power receiver and the output of the power receiver;

a communications modulator: on the DC side of the power receiver, the communications modulator typically comprising a resistor in series with a switch. On the AC side of the power receiver, the communications modulator typically comprises a capacitor in series with a switch (not shown in FIG. 4);

an output disconnect switch, which prevents current from flowing to the output when the power receiver does not provide power at its output. In addition, the output disconnect switch prevents current back flow into the power receiver when the power receiver does not provide power at its output. Moreover, the output disconnect switch minimizes the power that the power receiver draws from the power transmitter when a power signal is first applied to the secondary coil;

a rectified voltage sense.

The communications and control unit on the right-hand side of FIG. 4 comprises the digital logic part of the power receiver. This unit executes the relevant power control algorithms and protocols, drives the communications modulator, controls the output disconnect switch, and monitors several sensing circuits, in both the power pick-up unit and the load. An example of a sensing circuit in the load is a circuit that measures the temperature of, e.g., a rechargeable battery.

Power receiver designs that differ from the example functional block diagram shown in FIG. 4 are possible. For example, an alternative design includes post-regulation of the output of the rectification circuit (e.g., using a buck converter, battery charging circuit, power management unit, etc.).

Figure 5:
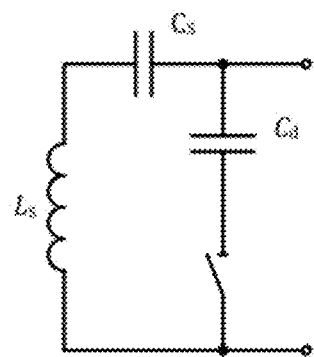
FIG. 5 shows a switched capacitance circuit connected to a secondary coil of a power receiver.

The dual resonant circuit of the power receiver comprises a secondary coil LS and two resonant capacitances CS and CD, as shown by way of example in FIG. 5. The secondary resonant capacitance CS is used to enhance power transfer efficiency. The purpose of the auxiliary resonant capacitance CD is to enable a resonant detection method. FIG. 5 illustrates a dual resonant circuit. The switch in the dual resonant circuit is optional. If the switch is not present, the capacitance CD has a fixed connection to the secondary coil.

Figure 6:
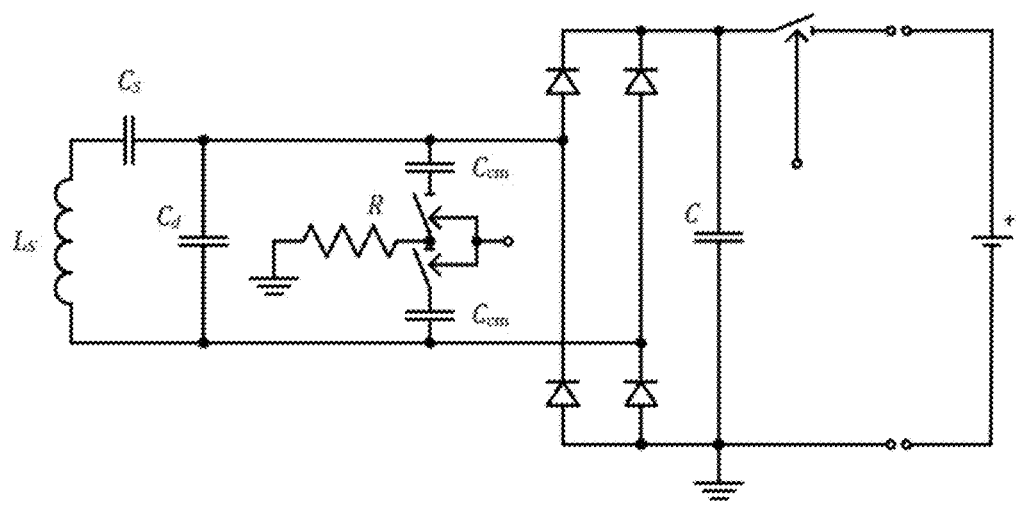
FIG. 6 shows another embodiment of a power receiver with switched capacitance configured to charge a battery.

An exemplary electric diagram of a power receiver that includes a communications modulator connected to a secondary coil LS, a rectification circuit composed of a diode bridge, suitable for charging a Lithium ions battery is shown in FIG. 6. Data are transmitted from the power receiver back to the power transmitter with a "back-scattering" technique by switching a R-C load (composed of the resistor R and of the two communication modulating capacitances CCM) referred to a common ground node.

Figure 7:
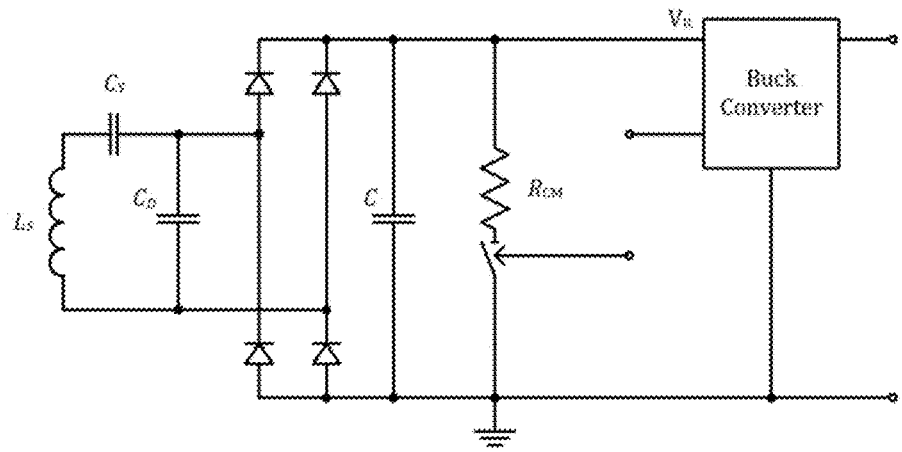
FIG. 7 shows yet another embodiment of a power receiver with switched load configured for generating a regulated voltage.
Figure 8:
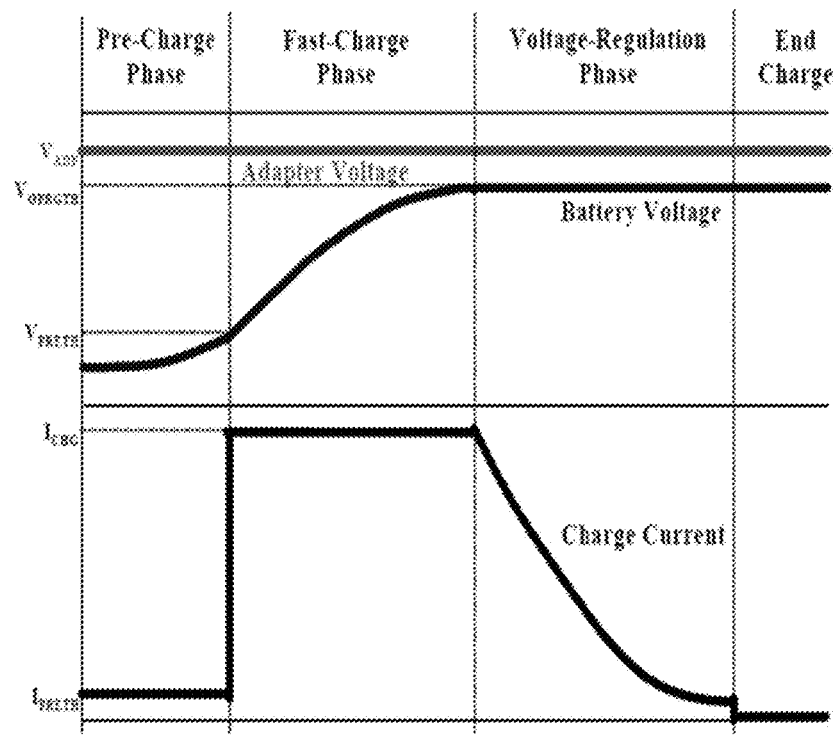
FIG. 8 is an exemplary time graph of a current delivered by prior power receivers, connected to charge a battery and a corresponding time graph of the battery voltage.

An alternative electric diagram of a power receiver is shown in FIG. 7. The "back-scattering" technique is implemented by switching a resistive load RCM referred to a common ground node. The rectified voltage VR is provided in input to a voltage regulator, for example a buck converter, that generates a regulated voltage that may be used to charge a battery. Information about the charging state of the battery is transmitted back to the power transmitter with a back scattering technique while the battery is being charge. Typically, exemplary time graphs of the charge voltage of the battery and of the charge current absorbed therefrom are as shown in FIG. 8.

Figure 10:
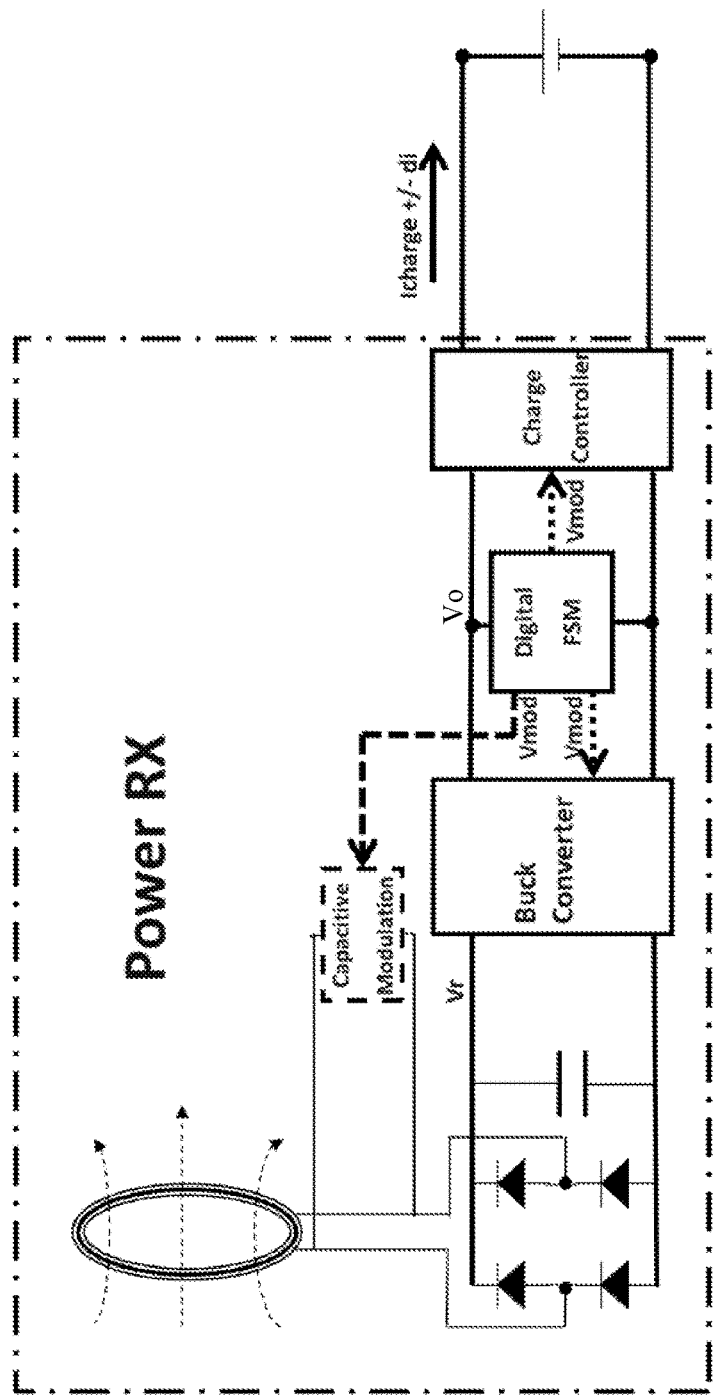
FIG. 10 shows an embodiment of a power receiver of this disclosure.

An embodiment of a power receiver POWER RX configured to charge a battery pack and capable of transmitting information with a back scattering technique in a wireless fashion about the battery charging process, is shown in FIG. 10. The meaning of the signals and of the functional blocks is resumed in following table:

| | |
|---|---|
| BUCK CONVERTER | Voltage regulator, for example a buck converter, optionally controlled with the modulation signal Vmod, configured to convert a rectified voltage Vr in a voltage Vo that may be constant or variable |
| CAPACITIVE MODULATION | Switched capacitance circuit that may be optionally connected to the secondary coil of the power receiver |
| CHARGE CONTROLLER | voltage-to-current converter, optionally controlled with the modulation signal Vmod |
| DIGITAL FSM | Modulator powered with the voltage Vo, configured to generate the modulation signal Vmod to control the circuit CAPACITIVE MODULATION and/or either the voltage regulator CONVERTER or the voltage-to-current converter |

The switched capacitance circuit CAPACITIVE MODULATION is substantially as shown in FIG. 5, the switch being controlled by the modulation signal Vmod, and may be omitted. According to an embodiment, the power receiver of this disclosure comprises the circuit CAPACITIVE MODULATION in order to further improve the efficiency of the back scattering transmission.

The modulator DIGITAL FSM transmits information about the battery charge by modulating the functioning of the voltage regulator BUCK CONVERTER or of the voltage-to-current converter CHARGE CONTROLLER, in order to modulate the charge current of the battery. As a consequence, the current absorbed by the voltage regulator BUCK CONVERTER is modulated and thus so is also the current flowing throughout the secondary coil, realizing a back scattering transmission.

Figure 9:
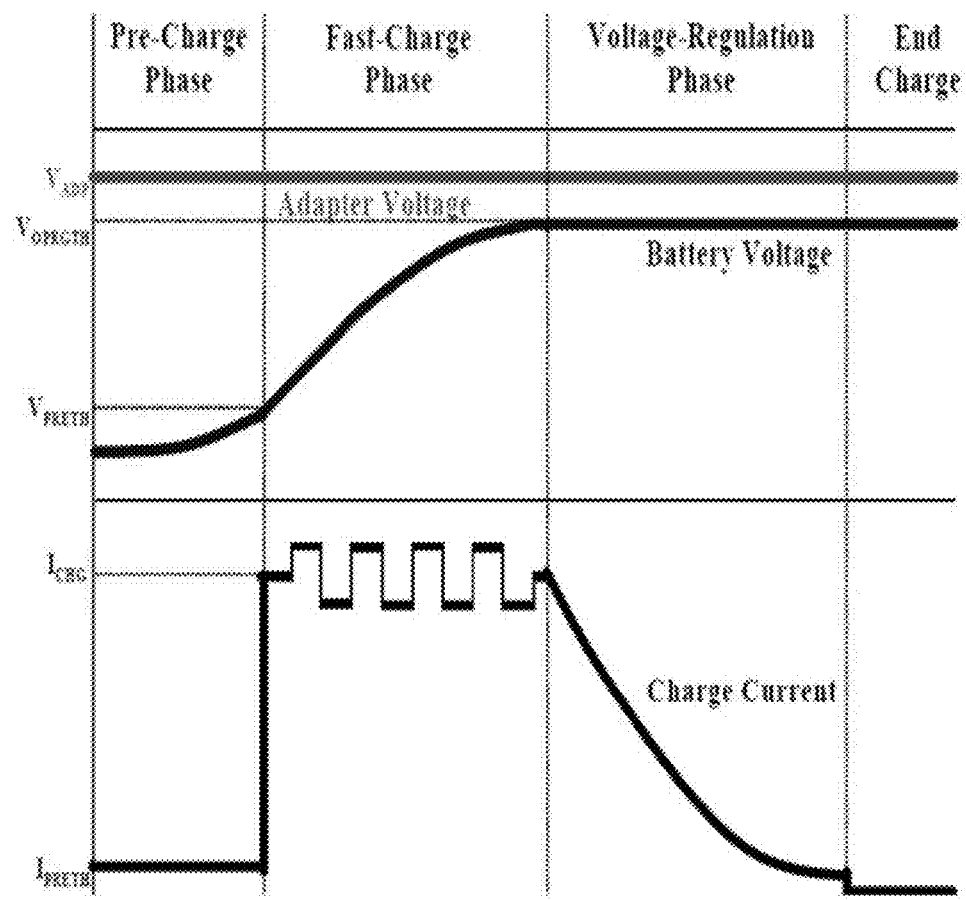
FIG. 9 is an exemplary time graph of a current delivered by a power receiver of this disclosure, connected to charge a battery and a corresponding time graph of the battery voltage.

An exemplary time graph of the charge current delivered by the power receiver of this disclosure is depicted in FIG. 9. During the fast-charge phase of the battery pack, during which the battery voltage is brought to its nominal level, the charge current is not constant, as in the time graph of FIG. 8, but it is generated as the sum of a nominal constant value with an AC signal, substantially a square wave. The time graph is not in scale, because the period of the AC charge current is much smaller than the time required for charging the battery (duration of the fast-charge phase).

In practice, differently from prior power receivers, the current flowing throughout the secondary winding is modulated by varying the charge current of the battery pack, instead of shunting a current throughout a resistive load. Therefore, power losses are relevantly reduced because no current is dissipated through a resistor for realizing a back scattering modulation.

Figure 11:
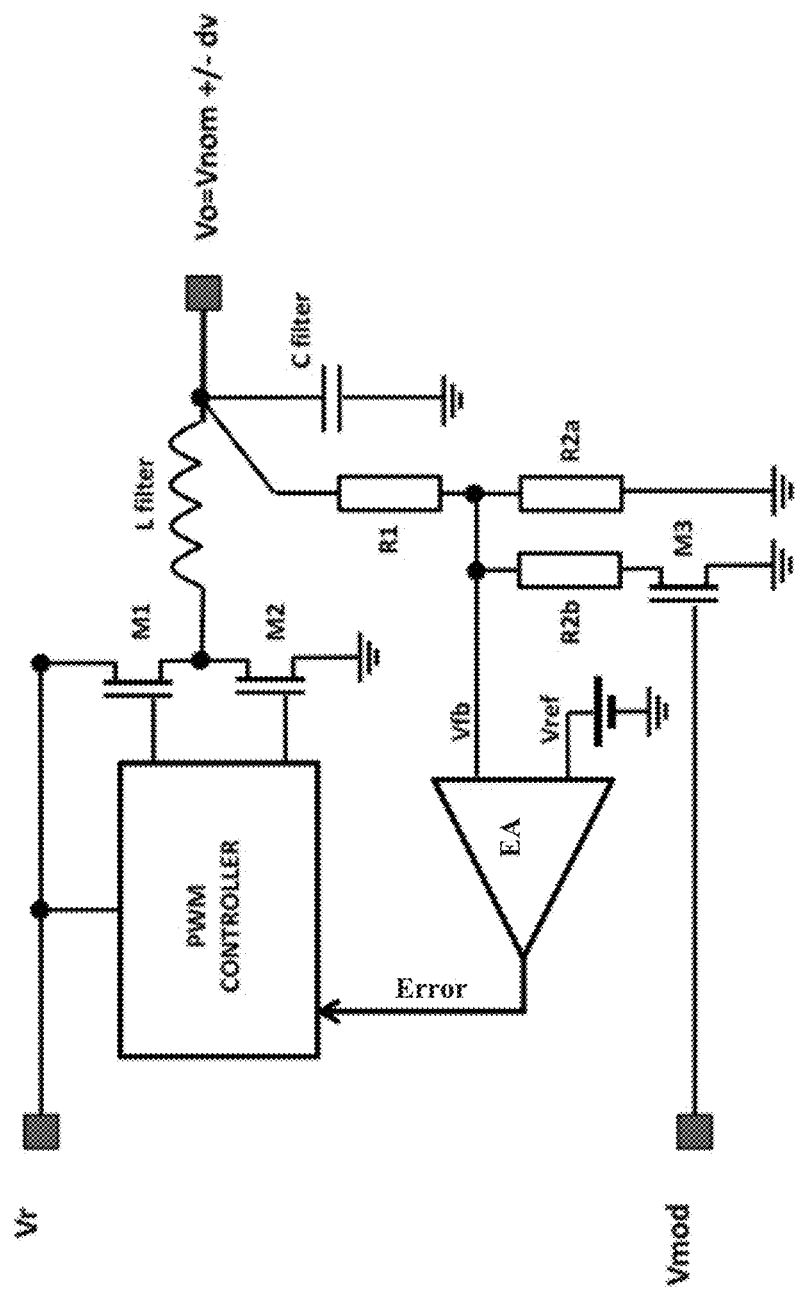
FIG. 11 shows an embodiment of a controller that may be used in a power receiver of this disclosure.

According to an embodiment, the voltage regulator BUCK CONVERTER of FIG. 10 is as shown in FIG. 11. A switching controller PWM CONTROLLER controls the switches of a half-bridge stage the drive a L-C filter. A resistive voltage divider R1 and R2$a$ generates a feedback voltage Vfb that is a scaled replica of the voltage Vo generated by the regulator. A switched resistive path R2$b$ and M3 is connected/disconnected in parallel with/from the resistor R2$a$ of the resistive voltage divider depending on the logic level of the modulation signal Vmod. An error amplifier EA compares the oscillating feedback voltage Vfb with a fixed threshold Vref, thus generating an error signal ERROR, provided in input to the switching controller PWM CONTROLLER, modulated according to the signal Vmod. As a consequence, the voltage Vo generated by the regulator has a DC nominal value Vnom and an AC value dv the oscillations of which are determined by the modulation signal Vmod. The voltage-to-current converter CHARGE CONTROLLER receives in input the oscillating voltage Vo and will deliver a corresponding charge current with a DC value Icharge and an AC value di.

Figure 12:
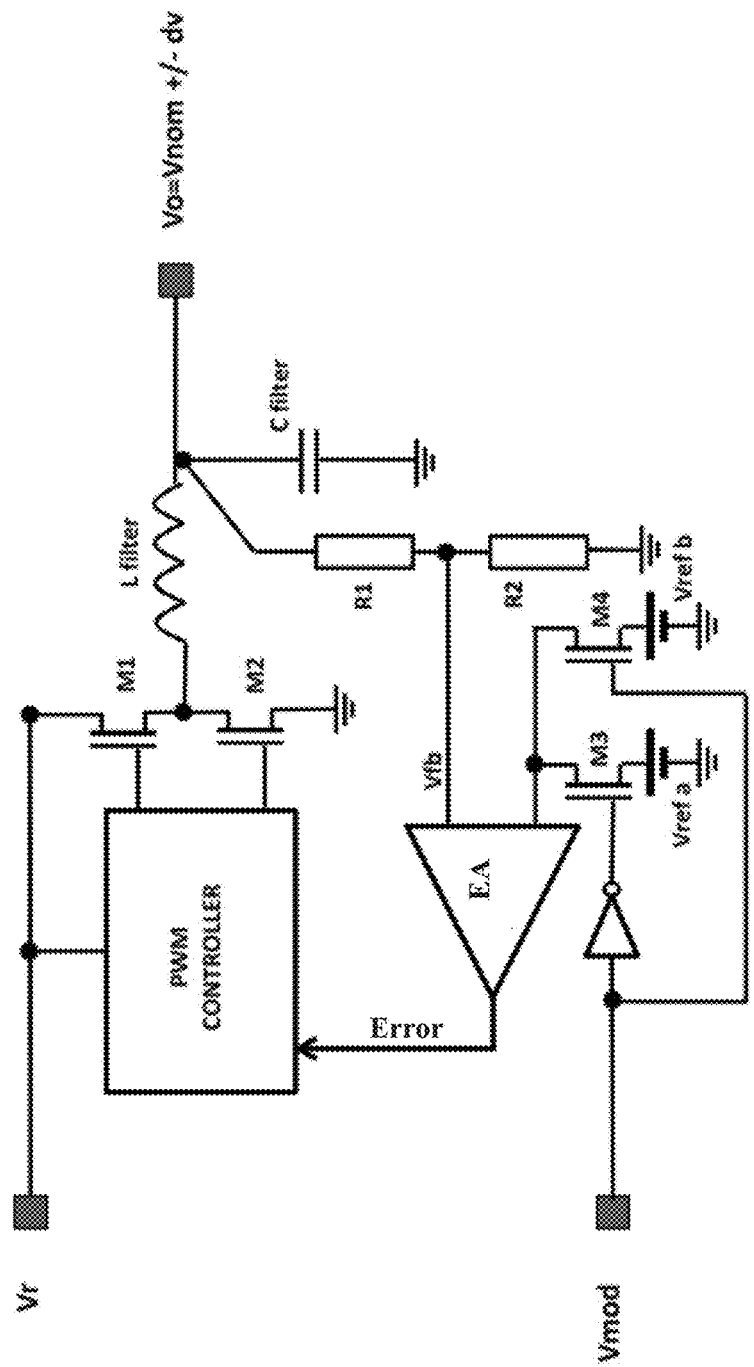
FIG. 12 shows another embodiment of a controller that may be used in a power receiver of this disclosure.

According to an embodiment, the voltage regulator BUCK CONVERTER of FIG. 10 is as shown in FIG. 12. Differently from the previous case, the feedback voltage Vfb is not modulated by modulation signal Vmod, and the error voltage ERROR is modulated by switching the reference voltage provided in input to the error amplifier EA between two different levels VREFA and VREFB by using the switches M3 and M4.

In both cases of FIGS. 11 and 12, the voltage-to-current converter may be any converter adapted to generate a current corresponding to the difference between the voltage Vo, that in this case is the sum of a nominal DC component Vnom and an AC component dv, and a fixed reference voltage.

Figure 13:
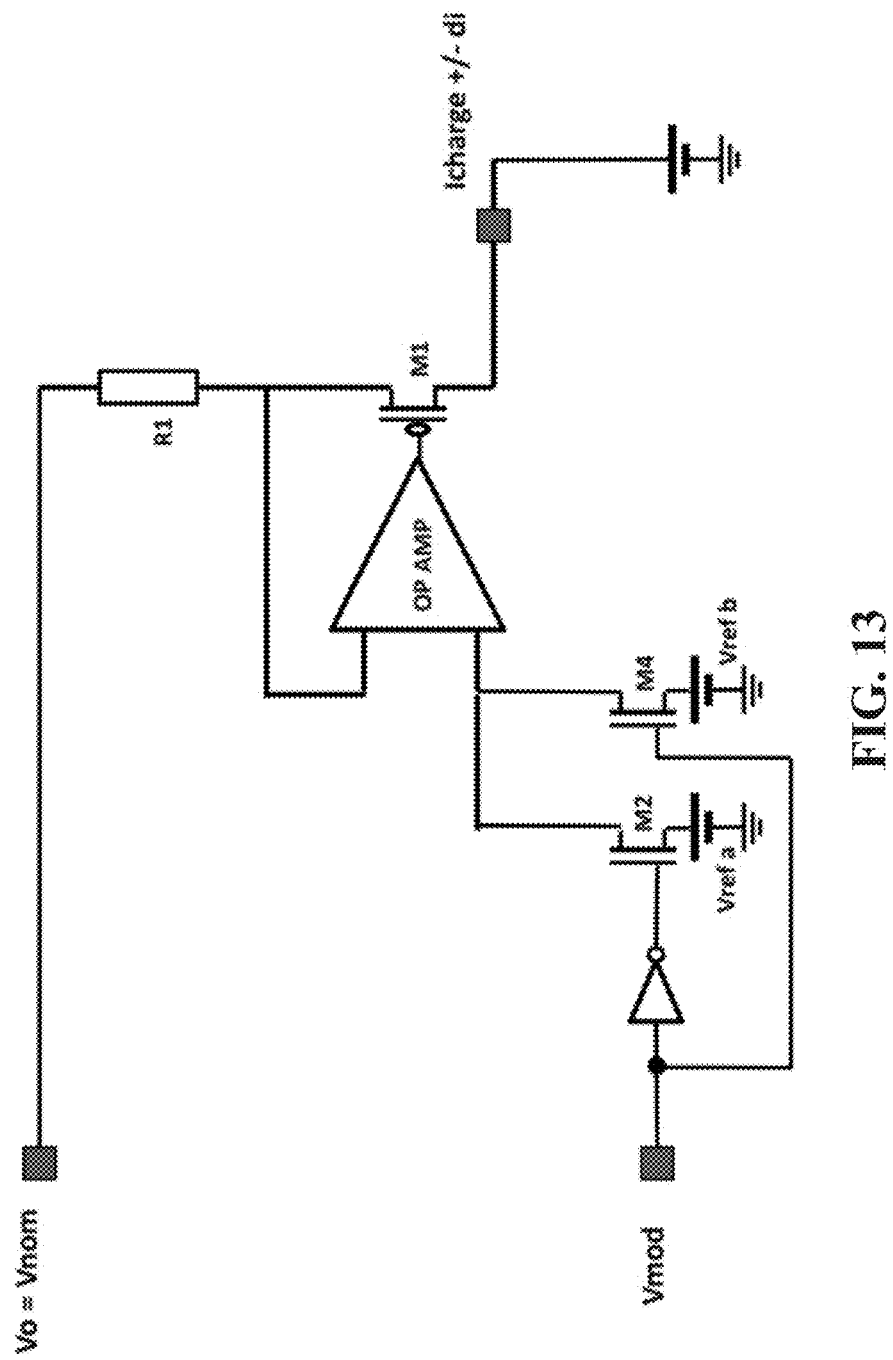
FIG. 13 shows an embodiment of a charge controller that may be used in a power receiver of this disclosure.

According to an embodiment, the voltage regulator BUCK CONVERTER is configured to generate a constant voltage Vo that is not modulated, and the voltage-to-current converter CHARGE CONTROLLER is configured as shown in FIG. 13. An operational amplifier OP AMP, a resistor R1 and a controlled transistor M1 are configured to deliver a current proportional to the difference between the voltage Vo (that is constant to a DC value Vnom) and a reference voltage, that is switched by the modulation signal Vmod through the switches M2 and M4 from a first level VREFA and a second level VREFB. In this case, the voltage regulator BUCK CONVERTER may be any voltage regulator, such as for example a buck regulator, adapted to generate a regulated voltage Vnom from a half-wave rectified voltage Vr.

The power receiver of this disclosure may be embedded in a mobile device and configured for powering a load, as schematically shown in FIG. 1. It may be also configured so as its secondary winding is magnetically coupled with the primary winding of a power transmitter, in order to realize a wireless power transfer system.

What is claimed is:

1. A power receiver, comprising:
    a resonant circuit having a pair of supply terminals between which an internal supply voltage of the power receiver is made available, comprising:
        a secondary coil configured to be magnetically coupled with a primary coil of a power transmitter,
        a first resonance capacitance coupled in series with said secondary coil, and
        a second resonance capacitance coupled between said pair of supply terminals;
    a voltage rectification circuit configured to receive said internal supply voltage and to generate a rectified voltage;
    a voltage regulator configured to receive said rectified voltage and generate a regulated voltage;
    a communication unit configured to monitor a functioning state of a load powered by said power receiver and generate a modulation data signal carrying information about said functioning state of the load; and
    a controlled voltage-to-current converter configured to receive said regulated voltage and further receive said modulation data signal and to deliver through an output line of the power receiver coupled to said load an output current having a DC value corresponding to said regulated voltage and having an AC value changing in response to said modulation data signal and causing a transmission of said information about said functioning state of the load to said power transmitter by backscatter from said secondary coil.

2. The power receiver of claim 1, wherein said voltage regulator is configured to adjust its functioning point to generate said regulated voltage as the sum of a nominal constant voltage and of an AC voltage corresponding to said modulation data signal.

3. The power receiver of claim 2, wherein said voltage regulator is a feedback switching converter comprising:
    a voltage divider having a center tap and configured to generate at said center tap a feedback voltage as a function of said regulated voltage;
    an error amplifier configured to receive in input said feedback voltage and a fixed reference voltage; and
    a switched circuit connected to said center tap and controlled by said modulation data signal to modulate a level of said feedback voltage synchronously with variations of said modulation data signal.

4. The power receiver of claim 2, wherein said voltage regulator is a feedback switching converter comprising:
    a voltage divider having a center tap and configured to generate at said center tap a feedback voltage as a scaled replica of said regulated voltage;
    an error amplifier configured to receive at a first input said feedback voltage and at a second input a reference voltage; and
    a switched circuit connected to said second input and controlled by said modulation data signal, the switched circuit configured to connect said second input with either a first reference voltage or a second reference voltage synchronously with variations of said modulation data signal.

5. The power receiver of claim 1, wherein said voltage regulator is configured to adjust its functioning point to keep said regulated voltage at a nominal constant voltage.

6. The power receiver of claim 1, further including a switched capacitance circuit coupled between said pair of supply terminals and comprising at least a modulation capacitor and a switch that is controlled with said modulation data signal and configured to control connection and disconnection of said modulation capacitor to and from said secondary coil.

7. The power receiver of claim 1, wherein said load is a battery configured to be charged in operation with said output current, said information about said functioning state of the load comprising battery temperature.

8. A wireless power transfer system, comprising:
    a power transmitter having a primary coil; and
    a power receiver comprising:
        a resonant circuit having a pair of supply terminals between which an internal supply voltage of the power receiver is made available, comprising:
            a secondary coil configured to be magnetically coupled with the primary coil of the power transmitter,
            a first resonance capacitance coupled in series with said secondary coil, and
            a second resonance capacitance coupled between said pair of supply terminals;
        a voltage rectification circuit configured to receive said internal supply voltage and to generate a rectified voltage;
        a voltage regulator configured to receive said rectified voltage and generate a regulated voltage;
        a communication unit configured to monitor a functioning state of a load powered by said power receiver and generate a modulation data signal carrying information about said functioning state of the load; and a controlled voltage-to-current converter configured to receive said regulated voltage and further receive said modulation data signal and to deliver through an output line of the power receiver coupled to said load an output current having a DC value corresponding to said regulated voltage and having an AC value changing in response to said modulation data signal and causing a transmission of said information about said functioning state of the load to said power transmitter by backscatter from said secondary coil; wherein the secondary coil is magnetically coupled with said primary coil.

9. A method of transmitting information contained in a modulation data signal carrying information about a functioning state of a powered load, comprising:

generating with a voltage regulator a regulated voltage from a rectified voltage obtained from a secondary coil that is magnetically coupled to a primary coil; and generating with a controlled voltage-to-current converter an output current delivered to the powered load, said output current having a DC value corresponding to said regulated voltage and having an AC value changing in response to said modulation data signal so as to cause a transmission of said information about the functioning state of the powered load to a power transmitter coupled to the primary coil by backscatter from said secondary coil;

wherein generating the regulated voltage comprises adjusting a functioning point of the voltage regulator for generating said regulated voltage as the sum of a nominal constant voltage and of an AC voltage changing in response to said modulation data signal.

10. A method of transmitting information contained in a modulation data signal carrying information about a functioning state of a powered load, comprising:

generating with a voltage regulator a regulated voltage from a rectified voltage obtained from a secondary coil that is magnetically coupled to a primary coil; and generating with a controlled voltage-to-current converter an output current delivered to the powered load, said output current having a DC value corresponding to said regulated voltage and having an AC value changing in response to said modulation data signal so as to cause a transmission of said information about the functioning state of the powered load to a power transmitter coupled to the primary coil by backscatter from said secondary coil;

wherein generating the regulated voltage comprises adjusting the functioning point of the voltage regulator for keeping said regulated voltage at a nominal constant voltage.

11. The system of claim 8, wherein said voltage regulator is configured to adjust its functioning point to generate said regulated voltage as the sum of a nominal constant voltage and of an AC voltage corresponding to said modulation data signal.

12. The system of claim 11, wherein said voltage regulator is a feedback switching converter comprising:

a voltage divider having a center tap and configured to generate at said center tap a feedback voltage as a function of said regulated voltage;

an error amplifier configured to receive in input said feedback voltage and a fixed reference voltage; and a switched circuit connected to said center tap and controlled by said modulation data signal to modulate a level of said feedback voltage synchronously with variations of said modulation data signal.

13. The system of claim 11, wherein said voltage regulator is a feedback switching converter comprising:

a voltage divider having a center tap and configured to generate at said center tap a feedback voltage as a scaled replica of said regulated voltage;

an error amplifier configured to receive at a first input said feedback voltage and at a second input a reference voltage; and a switched circuit connected to said second input and controlled by said modulation data signal, the switched circuit configured to connect said second input with either a first reference voltage or a second reference voltage synchronously with variations of said modulation data signal.

14. The system of claim 8, wherein said voltage regulator is configured to adjust its functioning point to keep said regulated voltage at a nominal constant voltage.

15. The system of claim 8, further including a switched capacitance circuit coupled between said pair of supply terminals and comprising at least a modulation capacitor and a switch that is controlled with said modulation data signal and configured to control connection and disconnection of said modulation capacitor to and from said secondary coil.

16. The system of claim 8, wherein said load is a battery configured to be charged in operation with said output current, said information about said functioning state of the load comprising battery temperature.

17. A wireless power transfer system, comprising:

a power transmitter having a primary coil; and a power receiver comprising:

a secondary coil magnetically coupled with the primary coil of the power transmitter and configured to generate an internal supply voltage;

a voltage rectification circuit configured to rectify said internal supply voltage and generate a rectified voltage;

a voltage regulator configured to generate a regulated voltage from said rectified voltage;

a voltage-to-current converter configured to receive said regulated voltage deliver to a load an output current having a DC value and an AC value; and a communication unit configured to monitor a functioning state of said load and generate a modulation data signal carrying information about said functioning state of the load;

wherein said voltage-to-current converter further receives the modulation data signal and varies the AC value of the output current in response to said modulation data signal so as to cause transmission of said modulation data signal to said power transmitter by backscatter from said secondary coil.

18. The power receiver of claim 17, wherein said voltage regulator is configured to adjust its functioning point to keep said regulated voltage at a nominal constant voltage.

19. The power receiver of claim 18, wherein said controlled voltage-to-current converter comprises:

a first transistor comprising a control terminal, a first conduction terminal and a second conduction terminal, the second conduction terminal coupled to said load;

a resistor coupled between said regulated voltage and the first conduction terminal of the first transistor;

an differential amplifier having an output coupled to the control terminal of the first transistor, and having a differential input including a first input and a second input, the first input coupled to the first conduction terminal of the first transistor providing negative feedback, the second input alternately coupled between a first and second reference voltage, responsive to the modulation data signal.

20. The power receiver of claim 19, the voltage-to-current converter further comprising:
   a first transistor switch coupled between the first reference voltage and the second input of the differential amplifier, the first transistor switch applying the first reference voltage to the second input of the amplifier responsive to the modulation data signal being in a first state; and
   a second transistor switch coupled between the second reference voltage and the second input of the differential amplifier, the first transistor switch applying the first reference voltage to the second input of the amplifier responsive to the modulation data signal being in a second state, said second state being different from the first state.

* * * * *